(12) United States Patent
Coleman et al.

(10) Patent No.: US 10,316,394 B2
(45) Date of Patent: Jun. 11, 2019

(54) UTILIZATION OF TEMPERATURE HEAT ADSORPTION SKIN TEMPERATURE AS SCALE CONTROL REAGENT DRIVER

(71) Applicant: ECOLAB USA INC., St. Paul, MN (US)

(72) Inventors: Kim R. Coleman, Naperville, IL (US); Rolf Arndt, Highlands Ranch, CO (US)

(73) Assignee: Ecolab USA Inc., St. Paul, MN (US)

( * ) Notice: Subject to any disclaimer, the term of this patent is extended or adjusted under 35 U.S.C. 154(b) by 213 days.

(21) Appl. No.: 15/332,795

(22) Filed: Oct. 24, 2016

(65) Prior Publication Data

US 2017/0037493 A1 Feb. 9, 2017

Related U.S. Application Data

(63) Continuation of application No. 13/952,139, filed on Jul. 26, 2013, now Pat. No. 9,476,108.

(51) Int. Cl.
*C22B 60/02* (2006.01)
*C22B 3/20* (2006.01)
(Continued)

(52) U.S. Cl.
CPC ...... *C22B 60/0221* (2013.01); *B01D 11/0207* (2013.01); *B05B 9/04* (2013.01);
(Continued)

(58) Field of Classification Search
CPC ..... C22B 60/0221; C22B 59/00; C22B 11/04; C22B 3/20; C22B 3/04; C22B 3/16;
(Continued)

(56) References Cited

U.S. PATENT DOCUMENTS 3,728,085 A 4/1973 Horiguchi et al.
3,805,880 A 4/1974 Lawlar
(Continued)

FOREIGN PATENT DOCUMENTS

CN 1490252 A 4/2004
CN 1831160 A 9/2006
(Continued)

OTHER PUBLICATIONS

International Search Report for International Application No. PCT/US2014/047331, dated Nov. 27, 2014, 3 pages.
(Continued)

*Primary Examiner* — Joseph W Drodge
(74) *Attorney, Agent, or Firm* — Kagan Binder, PLLC

(57) ABSTRACT

The invention provides methods, compositions, and apparatuses for preventing the formation of scale in heap leach process solution distribution systems comprised of piping, spray nozzles, or emitter tubes. Solution distribution system components often become fouled by scale because of local hot spots more prone to form scale than other locations along the systems length. Positioning sensors that detect periods of high temperature stress and adjusting scale control reagent dosage to send the right amount to inhibit hot spot deposition allows for the control of scale without using wasteful excessive amounts of scale control reagents. This can vastly improve scale control performance under high temperature stress conditions while minimizing scale control reagent waste under less severe stress conditions to reduce the total operating cost of running heap leach mining operations which depend upon well-functioning solution distribution systems.

12 Claims, 1 Drawing Sheet

(51) Int. Cl.
  *C02F 5/08* (2006.01)
  *C22B 3/44* (2006.01)
  *B05B 9/04* (2006.01)
  *B01D 11/02* (2006.01)
  *C22B 3/04* (2006.01)
  *C22B 59/00* (2006.01)
  *C02F 5/00* (2006.01)
  *C22B 3/00* (2006.01)
  *C02F 103/10* (2006.01)

(52) U.S. Cl.
  CPC .............. *C02F 5/00* (2013.01); *C02F 5/08* (2013.01); *C22B 3/04* (2013.01); *C22B 3/20* (2013.01); *C22B 3/44* (2013.01); *C22B 11/04* (2013.01); *C22B 59/00* (2013.01); *C02F 2103/10* (2013.01); *C02F 2209/02* (2013.01); *Y02P 10/234* (2015.11)

(58) Field of Classification Search
  CPC ..... C22B 3/1608; C22B 3/1616; C22B 3/165; C22B 3/1658; C22B 3/44; B05B 9/04; C02F 5/08; C02F 5/00; C02F 2209/02; C02F 2103/10; C02F 5/02; C02F 2103/00; C02F 2209/05; C02F 2209/055; C02F 2303/00; C02F 2303/22; Y02P 10/234; B01D 11/02; B01D 11/0207; G01N 25/00; G01N 25/48
  USPC ....... 210/696, 697, 739, 742, 766, 749, 600; 374/1, 4, 110, 111, 112, 155; 702/2, 3; 422/14; 423/27, 29, 658.5
  See application file for complete search history.

(56) References Cited

U.S. PATENT DOCUMENTS

| | | | |
|---|---|---|---|
| 4,143,702 A | 3/1979 | Barr, Jr. | |
| 4,322,297 A * | 3/1982 | Bajka | B01D 37/00 210/742 |
| 4,660,645 A | 4/1987 | Newlove et al. | |
| 4,670,166 A | 6/1987 | McDougall et al. | |
| 4,713,177 A | 12/1987 | Atwood et al. | |
| 4,783,314 A | 11/1988 | Hoots et al. | |
| 4,825,207 A * | 4/1989 | Snell | G08B 19/00 340/3.7 |
| 4,880,547 A * | 11/1989 | Etani | B05B 7/04 210/728 |
| 4,960,584 A | 10/1990 | Brown | |
| 5,030,279 A | 7/1991 | Krauth | |
| 5,215,574 A | 6/1993 | Kladder et al. | |
| 5,279,748 A * | 1/1994 | Hackett | C02F 9/005 210/167.11 |
| 5,332,559 A | 7/1994 | Brierley et al. | |
| 5,360,549 A | 11/1994 | Mouche et al. | |
| 5,368,830 A | 11/1994 | Alfano et al. | |
| 5,370,799 A | 12/1994 | Oddo et al. | |
| 5,403,493 A | 4/1995 | Mouche et al. | |
| 5,772,913 A | 6/1998 | Gill et al. | |
| 5,855,791 A | 1/1999 | Hays et al. | |
| 6,333,005 B1 | 12/2001 | Nguyen | |
| 6,365,101 B1 | 4/2002 | Nguyen et al. | |
| 6,428,597 B1 | 8/2002 | Cifuentes | |
| 6,997,518 B2 | 2/2006 | Vinegar et al. | |
| 7,160,354 B2 | 1/2007 | Kohr et al. | |
| 8,038,974 B2 | 10/2011 | Deckers et al. | |
| 8,906,202 B2 | 12/2014 | Grattan et al. | |
| 9,050,545 B1 * | 6/2015 | Seal | B01D 11/02 |
| 9,476,108 B2 * | 10/2016 | Coleman | C22B 3/04 |
| 9,513,055 B1 * | 12/2016 | Seal | F26B 19/00 |
| 2004/0067107 A1 | 4/2004 | Barrie et al. | |
| 2005/0211019 A1 | 9/2005 | Crundwell et al. | |
| 2006/0118761 A1 * | 6/2006 | Stapp | C02F 5/08 252/175 |
| 2007/0119277 A1 | 5/2007 | Russell et al. | |
| 2008/0003125 A1 | 1/2008 | Peterson et al. | |
| 2009/0035180 A1 | 2/2009 | Wan et al. | |
| 2009/0107921 A1 | 4/2009 | Chen et al. | |
| 2009/0230207 A1 | 9/2009 | Guzman et al. | |
| 2010/0222935 A1 * | 9/2010 | Forbes, Jr. | G06Q 10/00 700/291 |
| 2010/0242354 A1 | 9/2010 | Perkins et al. | |
| 2010/0292976 A1 | 11/2010 | Newcombe et al. | |
| 2011/0127216 A1 * | 6/2011 | Petrich | C02F 1/42 210/631 |
| 2011/0224905 A1 | 9/2011 | Haradcastle, III et al. | |
| 2012/0011967 A1 | 1/2012 | Morrow et al. | |
| 2012/0111152 A1 | 5/2012 | Gottschalk et al. | |
| 2012/0244058 A1 | 9/2012 | Ravishankar et al. | |
| 2012/0297928 A1 * | 11/2012 | Lang | C22B 3/02 75/386 |
| 2013/0012570 A1 | 1/2013 | Gollob et al. | |
| 2013/0015137 A1 * | 1/2013 | Urmenyi | B01D 37/04 210/654 |
| 2013/0255405 A1 | 10/2013 | Brumley et al. | |
| 2013/0299432 A1 | 11/2013 | Borkar et al. | |
| 2015/0027955 A1 * | 1/2015 | Coleman | C22B 3/04 210/696 |
| 2015/0184069 A1 | 7/2015 | Nuutinen et al. | |

FOREIGN PATENT DOCUMENTS

| | | |
|---|---|---|
| CN | 101254953 A | 9/2008 |
| CN | 101561076 A | 10/2009 |
| CN | 201368316 Y | 12/2009 |
| CN | 101868423 A | 10/2010 |
| CN | 101012511 B | 1/2011 |
| JP | 58-217649 A | 12/1983 |
| WO | 2013019627 A1 | 2/2013 |

OTHER PUBLICATIONS

Written Opinion for International Application No. PCT/US2014/047331, dated Nov. 27, 2014, 5 pages.
Extended European Search Report in European Application No. 18185169.2, dated Sep. 19, 2018, 5 pages.
"Gold extraction process and design by heap leaching," published on Jul. 31, 1993, edited by Lin Guoqi, Northeast University Press, pp. 43-45 (No English Version Available).
"Heavy nonferrous metals smelting design manual, volume of precious metals Sn, Sb, Hg", published on Aug. 31, 1995, edited by ENFI, Metallurgical Industry Press, pp. 568-570 (No English Version Available).
First Office Action with Search Report in Chinese Application No. 201710037193.1, dated Oct. 24, 2018, 35 pages (14 pages of English Translation and 21 pages Official Copy).

* cited by examiner

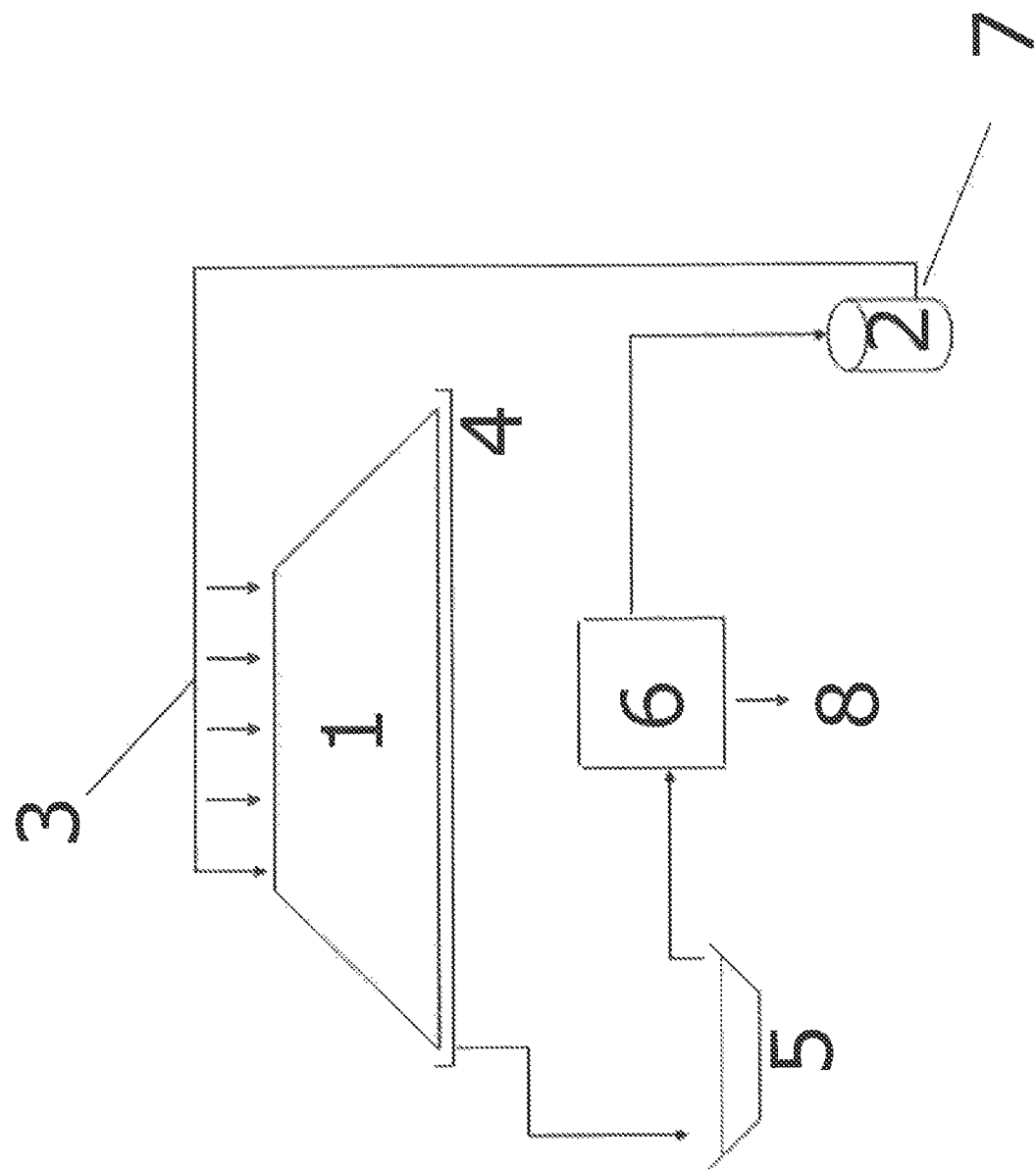

UTILIZATION OF TEMPERATURE HEAT ADSORPTION SKIN TEMPERATURE AS SCALE CONTROL REAGENT DRIVER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The invention relates to compositions, methods, and apparatuses for improving the inhibition of scale deposition. More specifically, the invention relates to a method of inhibiting scale deposition in process solution distribution systems consisting of piping, spray nozzles, and emitter tubes such as those used in heap leach mining operations.

In heap leach mining operations, a heap of valuable mineral containing ore is placed on a containment liner system (also known as a heap leach pad) and continuously sprayed or irrigated with a process solution, commonly referred to as barren solution, to wet the entire ore heap. The barren solution selectively extracts or leaches the valuable mineral(s) in the ore as the solution infiltrates through the ore heap. The solution collected after leaching which contains the targeted, valuable mineral(s) is known as pregnant solution. The pregnant solution is collected at the bottom of the ore heap and is transported to processing equipment, where the targeted valuable mineral(s) are selectively separated or recovered and barren solution is recycled to the heap. If lower than desired targeted mineral concentration is achieved in the pregnant solution, this solution, often referred to a lean pregnant solution, can be recycled to the heap for further leaching.

One problem commonly faced in heap leach mining operations is the precipitation and accumulation of mineral scale deposits in process solution distribution systems. Such scale impairs or clogs the flow of the process solution which can result in such problems as incorrect or inadequate dosage of barren or lean pregnant solution added to the heap, damage to solution distribution systems, loss of effectiveness of the solution, and increased energy needed to pump the solution through the solution distribution system. Currently such problems are addressed by feeding scale control reagents to protect the solution distribution system against mineral scale related plugging or damage, and to assure adequate flow rates.

The quantity or dosage of scale control reagent required for effective deposit control is dependent upon soluble mineral concentrations in the process solution in combination with physical stresses that impact saturation levels. Saturation levels are often highly variable impacted by variations in ore subjected to leach, make-up water volume and composition, process additive rates, and physical stress changes. Dosage rates of scale control reagent are however commonly held constant, often resulting in overdose (reagent waste) or under dose (inadequate control of scale) as conditions vary.

There thus exists an ongoing need to develop alternative and more efficient methods of controlling scale control reagent dosages applied to process solution distribution systems including those used in heap leach mining operations.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR § 1.56(a) exists.

BRIEF SUMMARY OF THE INVENTION

To satisfy the long-felt but unsolved needs identified above, at least one embodiment of the invention is directed towards a method of inhibiting the accumulation of scale on a surface in contact with a liquid medium. The method comprises the steps of: providing an solution distribution system comprising one or more of: piping, spray nozzles, emitter tubes, and any combination thereof having a length which defines more than one discrete region, each discrete region capable of having different surface temperatures; positioning at least one temperature sensor such that it is constructed and arranged to measure or predict the maximum surface temperature across all discrete regions within the solution distribution system; and applying a scale control reagent to a specific location in the solution distribution system when the measured or predicted surface temperature at that location exceeds a threshold required to initiate inverse solubility scale formation, at a reagent dosage required to prevent scale formation.

Additional features and advantages are described herein, and will be apparent from, the following Detailed Description.

BRIEF DESCRIPTION OF THE DRAWINGS

A detailed description of the invention is hereafter described with specific reference being made to the drawings in which:

FIG. 1 is an illustration of using an aspect of the invention to address scale in a heap leach mining operation.

For the purposes of this disclosure, like reference numerals in the figures shall refer to like features unless otherwise indicated. The drawings are only an exemplification of the principles of the invention and are not intended to limit the invention to the particular embodiments illustrated.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

"Consisting Essentially of" means that the methods and compositions may include additional steps, components, ingredients or the like, but only if the additional steps, components and/or ingredients do not materially alter the basic and novel characteristics of the claimed methods and compositions.

"Scale Control Reagent" means chemical reagents commonly applied for prevention of mineral scale deposition in aqueous solution environments falling in the general categories of threshold inhibitors, crystal modifiers, dispersants, sequestering agents, and or chelants. Common reagents may contain any combinations of these generic constituents.

"Heap Leaching" means an industrial mining process to extract precious metals including but not limited to copper, gold, silver, uranium, rare earth metals and other compounds from ore via the application to a heap of the ore of one or more liquid form chemical reagents that percolate through the heap and while so doing absorb specific minerals which then seep out of the heap.

"Emitter Tube" means a tube or flow line constructed and arranged to transport one or more fluids to a target area (such as for example an ore heap) and to allow for the application (often by dripping) of the fluid onto the target area.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the Kirk-Othmer Encyclopedia of Chemical Technology, 5th Edition, (2005), (Published by Wiley, John & Sons, Inc) this definition shall control how the term is to be defined in the claims.

At least one embodiment of the invention is directed towards the prevention of the formation and/or accumulation of scale in process solution distribution systems. Specifically the tendency of scale to form or accumulate at a specific localized spot along emitter tube's length, or in piping leading to the emitter tubes which may break loose and accumulate in the emitter tubes is identified and may be remedied. Piping and emitter tubes are commonly laid out in open areas where they allow for the gradual dripping of barren or lean pregnant solution onto a target area. These pipes and emitter tubes are often exposed to direct sunlight, sometimes in hot, sun intensive climates. In addition the specific materials the solution distribution systems are constructed out of can have high thermal absorption properties resulting in heat absorption and transfer to the inner wall of piping and emitter tubes. The cumulative effect is that specific localized portions of the piping and emitter tubes can become hot enough to effect inverse temperature solubility of many scale producing materials. For these materials when the temperature exceeds a threshold precipitation results.

With exposed piping and emitter tubes, the bulk solution as whole may have an average temperature that is below the threshold for scale formation, but localized pipe and emitter tube surface temperatures where solution contact occurs may be substantially hotter such that localized precipitation and scaling occurs. Once scale starts to form on these surface(s), the established scale can function as a seed or anchor on which more scale can rapidly accumulate.

In at least one embodiment prediction or measurement of piping and emitter tube heat transfer intensity can be utilized to predict scale control reagent dosage requirements. In at least one embodiment the scale produced is at least in part a result of exposure to sunlight and is therefore broadly predicted based upon ambient temperature, temperature change rates, and commonly available weather related measurements.

In at least one embodiment the scale produced is at least in part a result of heat transfer resulting in solution temperature elevation and therefore localized heat intensity prediction may include bulk solution temperatures at various point in the solution distribution system, and temperature change rates.

In at least one embodiment temperature measurement using a detector or a device that can be used to infer a spike in temperature are used to determine the degree to which process piping or emitter tube's surfaces are being subjected to temperature elevation.

In at least one embodiment scale control reagents are fed to a location where it has been detected that temperature is such that scale would form. In at least one embodiment chemicals are only fed in such an amount or dosage to address the scale in the specific location so detected. In at least one embodiment scale controlling chemicals are fed to a location where the temperature has exceeded the threshold for formation but insufficient time has elapsed for detectable amounts of scale to form.

In at least one embodiment the emitter tube is part of a heap leach mining operation. Representative examples of heap leach mining operations the invention may be used within and how emitter tubes are located therein are described at least in U.S. Pat. Nos. 5,030,279 and 4,960,584 and in U.S. Published Patent Application 2013/0125709.

In at least one embodiment the scale producing heat is at least in part a result of exposure to sunlight and is therefore detected via one or more sunlight measuring or detecting optical sensors. The sensor may be constructed and arranged to measure sunlight intensity and to calculate from that if the temperature of one or more localized locations along the emitter tube will exceed the threshold required for scale formation.

In at least one embodiment scale control reagent dosage is automatically adjusted if such a determination is made.

In at least one embodiment the temperature sensor is one item selected from the list consisting of: thermocouple, resistive temperature device, infrared detector, bimetallic device, liquid expansion device, and any combination thereof.

Referring now to FIG. 1 there is shown an application of the invention. Ore is collected into a heap (1) lying on a pad (4). Onto the heap barren solution (2) is fed via a process distribution system which may comprise a series of emitter tubes each with one or more opening in an emitter tube (3) and which may open into one or more nozzles. As the solution percolates through the heap (1) it leaches or solubilizes valuable minerals into pregnant solution which is collected and transferred to a processing plant where the valuable mineral (8) is then separated from the reagent through one or more recovery processes (6). In some operations multiple pad area are under leach simultaneously or intermittently, and low concentration pregnant solutions may be recycled back to the heap for additional leaching.

Because of such variables as tube shape, position, exposure to elements, exposure to sunlight, etc. it is quite likely that the surface of pipint and emitter tubes at one location will become hotter than another location and will become an anchor for scale formation. As a result respectively located sensors may be used to detect localized temperature spikes that can cause scale.

In at least one embodiment the dosage of the scale control reagent (7) is so dosed as to assure that adequate dosage of scale control reagent is applied under high temperature stress conditions, and that reduced dosage is applied when temperature stress is relieved.

In at least one embodiment the scale comprises at least in part CaCO₃ or other common mineral scale forming compound In at least one embodiment the scale control reagent is applied according to the methods described in U.S. Pat. No. 5,368,830.

In at least one embodiment in response to the detection and/or anticipation of at least one localized hot spot in at least a portion of a process distribution system a scale control reagent is introduced into the process distribution system. Such an introduced reagent may be directed to: the localized hot spot, some overall percentage of the process distribution system, or throughout the entire process distribution system. The reagent may be introduced such that it is present wherever the barren solution is also present within the process distribution system. The reagent may be fed in such a manner that it remains present within the hot spot or other portions of the process distribution system for some or all of the time that the detected and/or anticipated temperature spike is manifest. In at least one embodiment the reagent can then be gradually or rapidly cut off from the process distribution system as the localized temperature spike declines or disappears.

In at least one embodiment a hot simulator is used increase the effectiveness and/or efficiency of a sensor or anticipation method. Often in process distribution systems the pumps that feed reagent or other materials into the pipes and tubes are located quite a distance from the emitter tubes or nozzles, this distance can be 1, 2-10, or more miles. In a hot simulator a section of tubing made from the identical materials as an emitter tube or nozzle and is located within 1000 feet of a pump and affixed to it is a heat sensor. This tubing may or may not be in fluidic communication with the process distribution system and will mirror what is happening downstream in the process distribution system. The closely positioned tubing allows for monitoring of heat spikes without the need for complicated wired or wireless transmission systems. In at least one embodiment scale control reagent is fed into at least a portion of the process distribution system in response to a measurement of a heat spike in a hot simulator and/or in response to the anticipation of a heat spike in a hot simulator.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments mentioned herein, described herein and/or incorporated herein. In addition the invention encompasses any possible combination that also specifically excludes any one or some of the various embodiments mentioned herein, described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A process solution distribution system comprising:

a pump to distribute a scale control reagent to at least a portion of the process distribution system in response to a measured or calculated temperature;

emitter tubing in fluid communication with the pump and exposed to weather and direct sunlight and configured to allow dripping of a fluid onto a target area;

optional piping in fluid communication with the pump and the emitter tubing;

a section of tubing located within 1000 feet of the pump, the section of tubing comprising the same materials as the emitter tubing, the section of tubing characterized as not being in fluid communication with the pump or emitter tubing;

a first sensor affixed to the section of tubing, the first sensor adapted to measure or calculate the measured or calculated temperature; and optionally at least one additional second sensor affixed to the section of tubing to measure or calculate the measured or calculated temperature; and wherein the pump is adapted to automatically adjust the amount of scale control reagent distributed to at least a portion of the process distribution system based on the measured or calculated temperature.

2. The process solution distribution system of claim 1 wherein the first sensor and optionally the second sensor are selected from the list consisting of: thermocouple, resistive temperature device, infrared detector, bimetallic device, liquid expansion device, and any combination thereof.

3. The process solution distribution system of claim 1 wherein the first sensor and optionally the second sensor are an optical sensor constructed and arranged to measure sunlight intensity, further wherein the temperature is calculated to correspond to a temperature at one or more localized locations along the emitter tubing, the piping, or both.

4. The process solution distribution system of claim 1 further comprising one or more nozzles, the nozzles in fluid communication with the pump and emitter tubing.

5. The process solution distribution system of claim 1 further comprising a process solution contained within the emitter tubing, the piping, or both the emitter tubing and the piping.

6. The process solution distribution system of claim 5 wherein the process solution is a barren solution or a lean pregnant solution.

7. The process solution distribution system of claim 5 wherein the measured or calculated temperature is a temperature that exceeds a threshold for scale formation within the process solution distribution system.

8. The process solution distribution system of claim 1 wherein the emitter tubing and optional piping define a plurality of discrete regions, wherein each discrete region is capable of having different surface temperatures; and wherein the pump is adapted to distribute scale control reagent to a selected discrete region.

9. The process solution distribution system of claim 8 further comprising a process solution contained within the emitter tubing, the piping, or both the emitter tubing and the piping, wherein the selected discrete region comprises a surface temperature in excess of the threshold for scale formation within the process solution distribution system.

10. The process solution distribution system of claim 1 further comprising:
- a heap of mineral containing ore;
- a process solution contained within the emitter tubing, the piping, or both the emitter tubing and the piping; and
- the emitter tubing, the piping, or both the emitter tubing and the piping positioned and adapted to distribute the process solution to the heap.

11. The process solution distribution system of claim 10 wherein the process solution is a barren solution or a lean pregnant solution.

12. The process solution distribution system of claim 10 wherein the mineral containing ore comprises gold, silver, uranium, or a rare earth metal.

\* \* \* \* \*